(12) United States Patent
Kim et al.

(10) Patent No.: US 6,259,818 B1
(45) Date of Patent: *Jul. 10, 2001

(54) CONTOUR APPROXIMATION APPARATUS FOR REPRESENTING A CONTOUR OF AN OBJECT

(75) Inventors: Jin-Hun Kim; Jong-Lak Kim, both of Seoul (KR)

(73) Assignee: Daewoo Electronics Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 08/423,604

(22) Filed: Apr. 17, 1995

(30) Foreign Application Priority Data

Mar. 18, 1995 (KR) .................................................. 95-5714

(51) Int. Cl.[7] .................................................. G06K 9/48
(52) U.S. Cl. .......................... 382/242; 348/26; 356/376; 382/241; 382/250
(58) Field of Search .................... 382/241, 250, 382/185, 128, 164, 242, 201, 100, 266; 348/390, 384, 403, 404, 26, 27; 156/58; 356/2, 376; 364/474.29; 367/88

(56) References Cited

U.S. PATENT DOCUMENTS

| | | | |
|---|---|---|---|
| 4,566,124 | * 1/1986 | Yamamoto | 382/185 |
| 4,748,675 | * 5/1988 | Suzuki | 382/241 |
| 4,908,872 | * 3/1990 | Toriu et al. | 382/197 |
| 5,054,103 | * 10/1991 | Yasuda | 382/250 |
| 5,214,718 | * 5/1993 | Khosla | 382/241 |
| 5,233,671 | * 8/1993 | Murayama | 382/242 |
| 5,295,201 | 3/1994 | Yokohama | 382/236 |
| 5,304,988 | * 4/1994 | Seto | 345/141 |
| 5,327,366 | * 7/1994 | Man | 708/321 |
| 5,455,680 | * 10/1995 | Shin | 358/426 |
| 5,510,838 | * 4/1996 | Yomdin | 348/384 |
| 5,592,228 | * 1/1997 | Dachiku et al. | 348/416 |
| 5,764,808 | * 6/1998 | O'Connell et al. | 382/242 |
| 5,881,183 | * 3/1999 | Lee | 382/288 |

FOREIGN PATENT DOCUMENTS

4167082   6/1992   (JP) .

OTHER PUBLICATIONS

Yukio Sato, "Piecewise Linear Approximation of Plane Curves by Perimeter Optimization" Pattern Recognition '92, vol. 25, No. 12, Dec. 1992, pp. 1535–1543.

Biswas et al., "Approximate Coding of Digital Contours" IEEE Transactions on Systems, Man and Cybernetics, vol. 18, No. 6, Nov. 1988, pp. 1056–1066.

Michael Hötter, "Object–Oriented Analysis–Synthesis Coding Based on Moving Two–Dimensional Objects", Signal Processing: Image Communication 2, 409–428 (1990).

* cited by examiner

*Primary Examiner*—Jay Patel
(74) *Attorney, Agent, or Firm*—Anderson Kill & Olick, PC

(57) ABSTRACT

A contour approximation apparatus for representing a contour image of an object comprises a polygonal approximation section for determining a number of vertices on the contour image and fitting the contour image with a plurality of line segments to provide a polygonal approximation of the contour image, a sampling circuit for providing N sample points for each of the line segments, an error detector for calculating an error for each of the N sample points on each of the line segments to produce a set of errors for each of the line segments, a discrete sine transform and quantization block for transforming each set of errors into a set of discrete sine transform coefficients, and for converting the set of discrete sine transform coefficients into a set of quantized transform coefficients.

7 Claims, 2 Drawing Sheets

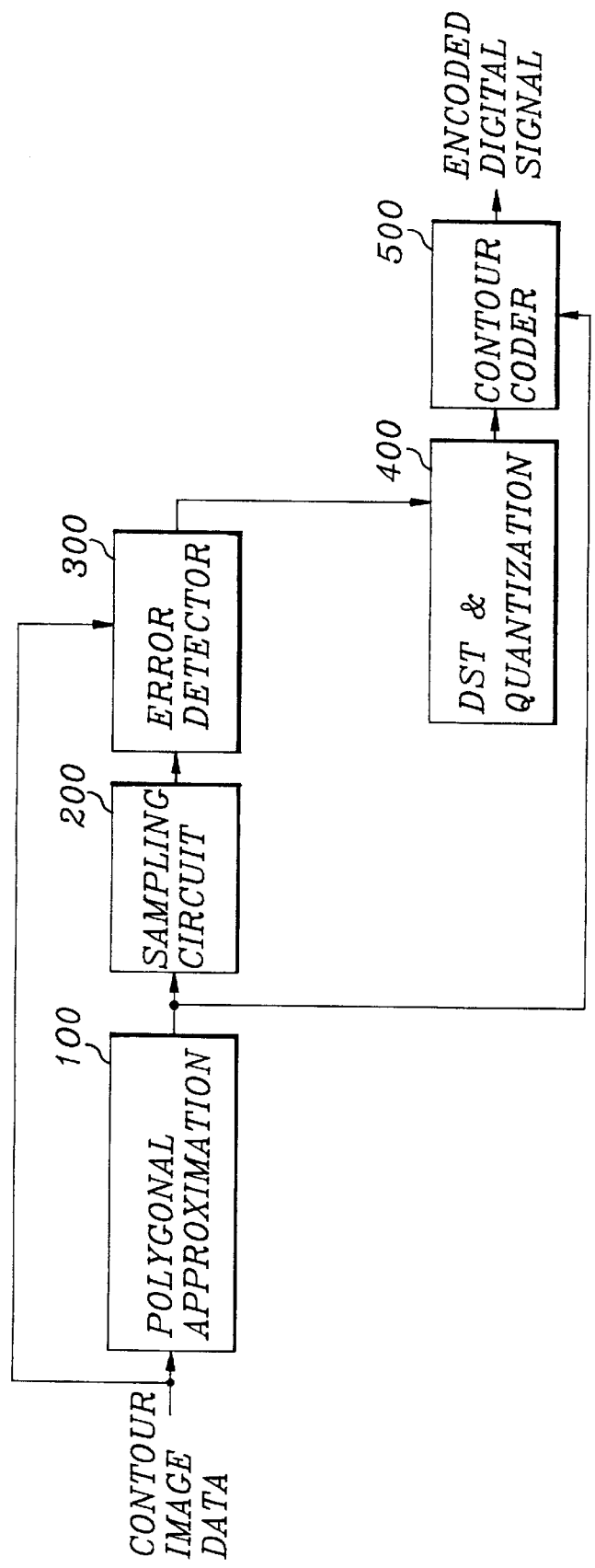

FIG. 2A   FIG. 2B   FIG. 2C
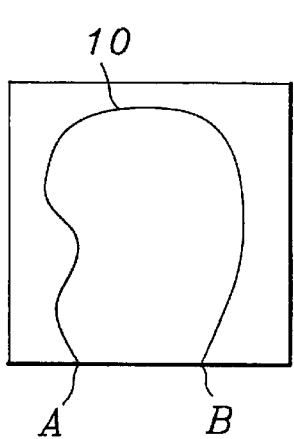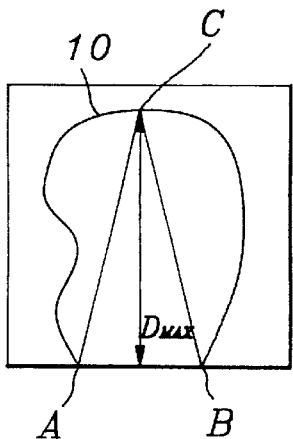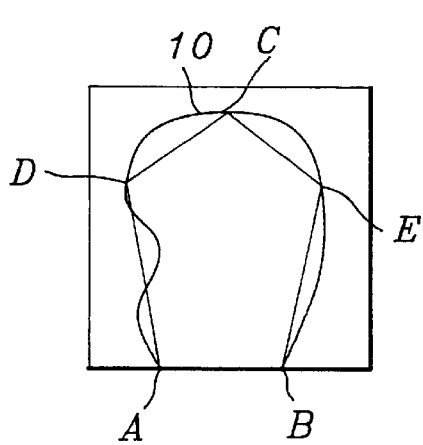
FIG. 3A
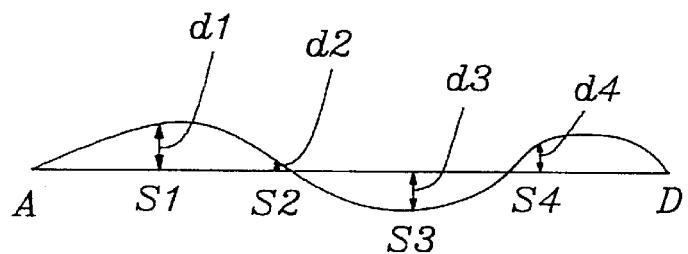
FIG. 3B
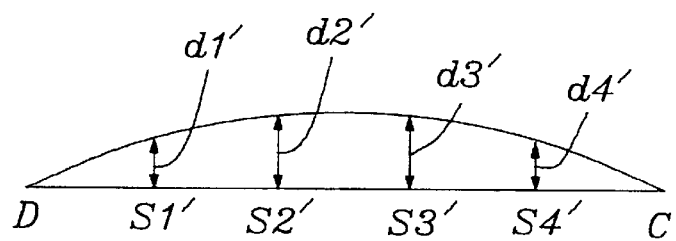

CONTOUR APPROXIMATION APPARATUS FOR REPRESENTING A CONTOUR OF AN OBJECT

FIELD OF THE INVENTION

The present invention relates to a contour approximation apparatus for use in a video signal encoder; and, more particularly, to a contour approximation apparatus for reconstructing a contour of an object.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is inevitable to compress or reduce the volume of data through the use of various data compression techniques, especially, in the case of such low bit-rate video signal encoder as video-telephone and teleconference system.

One of such methods for encoding video signals for a low bit-rate encoding system is the so-called object-oriented analysis-synthesis coding technique(see Michael Hötter, "Object-Oriented Analysis-Synthesis Coding Based on Moving Two-Dimensional Objects", Signal Processing: Image Communication 2, 409–428(1990)).

According to the object-oriented analysis-synthesis coding technique, an input video image is divided into objects; and three sets of parameters for defining the motion, contour and pixel data of each object are processed through different encoding channels.

Specifically, in processing a contour image of an object, contour information is important for the analysis and synthesis of the object shape. The classical coding method for representing the contour information is the chain coding. The chain coding method, however, requires a substantial amount of bits for the representation thereof although there is no loss in the contour information.

In this regard, there have been proposed several methods to approximate contours such as polygonal approximation and B-spline approximation, etc. One of the disadvantages in the polygonal approximation is the rough representation of the contour image. The B-spline approximation is, on the other hand, capable of representing the contour image more precisely: however, it requires high-order polynomials to reduce approximation errors, thereby increasing the overall computational complexity of the video encoder.

SUMMARY OF THE INVENTION

It is, therefore, a primary object of the invention to provide a novel contour approximation apparatus by employing a polygonal approximation and discrete sine transform(DST), thereby providing a representation of an contour image with an increased accuracy and a reduced overall computational complexity.

In accordance with the invention, there is provided a contour approximation apparatus, for use in a video signal encoder, for representing a contour image of an object, which comprises: means for determining a number of vertices on the contour image; means for fitting the contour image with a plurality of line segments to provide a polygonal approximation of the contour image, each of the line segments joining two neighboring vertices; means for providing N sample points for each of the line segments, said N sample points being equi-spaced on each of the line segments; means for calculating an error for each of the N sample points on each of the line segments to produce a set of errors for each of the line segments, each of the errors of the set representing the distance between said each of the N sample points and the contour image; means for converting each set of errors into a set of discrete sine transform coefficients; and means for generating the set of discrete sine transform coefficients into a set of quantized transform coefficients.

BRIEF DESCRIPTION OF THE DRAWINGS

The above and other objects and features of the present invention will become apparent from the following description of preferred embodiments given in conjunction with the accompanying drawings, in which:

FIG. 1 depicts a block diagram of the inventive contour approximation apparatus for representing a contour image;

FIGS. 2A to 2C illustrate an exemplary polygonal approximation process of the contour image; and FIGS. 3A and 3B show exemplary diagrams, each of which representing errors between a line segment joining two vertices and its corresponding contour image.

DETAILED DESCRIPTION OF THE PREFERRED EMBODIMENTS

Referring to FIG. 1, there is shown a block diagram of the inventive contour approximation apparatus for representing a contour image of an object expressed in a video signal.

The contour image data representing the contour of an object is fed to a polygonal approximation section 100 and an error detector 300. At the polygonal approximation section 100, the contour image is approximated by a polygonal approximation technique. The polygonal approximation of the object shape is achieved through the use of a conventional approximation algorithm for fitting the contour image by line segments.

Referring to FIGS. 2A to 2C, there is illustrated a segmentation process for an exemplary contour image 10 according to the polygonal approximation technique.

First, two starting vertices are selected. If the contour image is of an open loop, two end points, e.g., A and B as shown in FIG. 2A, are selected as the starting vertices. On the other hand, if the contour image is in the form of a closed loop, two farthest points on the contour are selected as the starting vertices. And then, the farthest point on the contour from a line segment AB is determined. If the distance $D_{max}$ between the farthest point, e.g., C, and the line segment AB is greater than a predetermined threshold value, the point C becomes a vertex. This procedure is repeated until said $D_{max}$ for each segment becomes smaller than the predetermined threshold value.

The number of vertices depends on the predetermined threshold value. As can be seen from FIGS. 2A to 2C, the representation of the contour image by line segments becomes more accurate with a smaller predetermined threshold value at the expense of coding efficiency.

Referring back to FIG. 1, vertex information representing the positions of the determined vertices, e.g., A, B, C, D and E, of the contour image 10 is provided from the polygonal approximation section 100 to a sampling circuit 200 and a contour coder 500. The sampling circuit 200 provides N sample points for each line segment to the error detector 300, the N sample points being equi-spaced on each line segment between two vertices with N being an integer. Based on the vertex information from the sampling circuit 200 and the contour image data, the error detector 300 calculates an approximation error at each of the N sample points on each line segment and provides the errors to a discrete sign transform(DST) and quantization block 400. The approximation errors represent the distances between a line segment joining two vertices and the contour segment between the two vertices.

FIGS. 3A and 3B illustrate exemplary diagrams representing errors between line segments and corresponding contour segments, wherein FIG. 3A depicts errors between the line segment AD and its corresponding contour segment and FIG. 3B shows errors between the line segment DC and its corresponding contour segment. Each of the errors d1 to d4 or d1' to d4' represents the distance from each sample point s1 to s4 on the line segment AD or s1' to s4' on the line segment DC to the corresponding contour segment. As can be seen in FIGS. 3A and 3B, the approximation errors for the vertices are all "zeros". For all the vertices are positioned on the contour.

The errors calculated by the error detector 300 are supplied to the DST and quantization block 400 for generating quantized DST coefficients. The DST and quantization block 400 performs one-dimensional DST operation on each set of errors to produce a set of DST coefficients, errors for each set including errors for N sample points and two vertices of each line segment; and quantizes the set of DST coefficients to provide a set of quantized DST coefficients corresponding to each line segment to the contour coder 500 for further processing.

At the contour coder 500, each set of the quantized DST coefficients is encoded, e.g., by using the binary arithmetic code of JPEG(Joint Photographic Experts Group), while the vertex information from the polygonal approximation section 100 is encoded by using, e.g., a fixed length code without compression since the vertices are sparsely correlated. The encoded digital signal comprising the encoded quantized DST coefficients and the vertex information is transmitted to a transmitter for the transmission thereof.

While the present invention has been described with reference to the particular embodiments, it will be apparent to those skilled in the art that various changes and modifications may be made without departing from the spirit and scope of the invention as defined in the following claim.

What is claimed is:

1. A contour approximation apparatus, for use in a video signal encoder, for representing a contour image of an object, comprising:

means for determining a number of vertices on the contour image;

means for fitting the contour image with a plurality of line segments to provide a polygonal approximation of the contour image, each of the line segments joining two neighboring vertices;

means for providing N sample points for each of the line segments, N being an integer and said N sample points being equi-spaced on each of the line segments;

means for calculating an error for each of the N sample points on each of the line segments to produce a set of errors for each of the line segments, each of the errors of the set representing the distance between said each of the N sample points and the contour image;

discrete sine transform coding means for transforming each set of errors into a set of discrete sine transform coefficients; and means for converting the set of discrete sine transform coefficients into a set of quantized transform coefficients.

2. The contour approximation apparatus as recited in claim 1, wherein the means for determining a number of vertices includes means for generating vertex information representing the determined vertices, and further comprising means for generating the quantized transform coefficients and the vertex information as an encoded digital signal to be transmitted.

3. The contour approximation apparatus as recited in claim 2, wherein N is 8.

4. The contour approximation apparatus as recited in claim 3, wherein the means for generating the encoded digital signal includes means for encoding the quantized transform coefficients by using a known binary arithmetic code.

5. A video signal encoder having a contour approximation apparatus for converting a contour image of an object into an encoded digital signal, the contour approximation apparatus comprising:

means for determining a number of vertices on the contour image to generate vertex information representing the determined vertices;

means for fitting the contour image with a plurality of line segments to provide a polygonal approximation of the contour image, each of the line segments joining two neighboring vertices;

means for providing N sample points for each of the line segments, N being an integer and said N sample points being equi-spaced on each of the segments;

means for calculating an error for each of the N sample points on each of the line segments to produce a set of errors for each of the line segments, each of the errors of the set representing the distance between said each of the N sample points and the contour image;

discrete sine transform coding means for transforming each set of errors into a set of transform coefficients;

means for converting the set of transform coefficients into a set of quantized transform coefficients; and means for generating the quantized transform coefficients and the vertex information as an encoded digital signal to be transmitted.

6. The video signal encoder as recited in claim 5, wherein the means for generating the encoded digital signal includes means for encoding the quantized transform coefficients by using a known binary arithmetic code.

7. The video signal encoder as recited in claim 6, wherein N is 8.

* * * * *